(12) United States Patent
Wilker et al.

(10) Patent No.: US 11,130,886 B2
(45) Date of Patent: Sep. 28, 2021

(54) ADHESIVES

(71) Applicant: Purdue Research Foundation, West Lafayette, IN (US)

(72) Inventors: Jonathan James Wilker, West Lafayette, IN (US); Michael Gabriel Mazzotta, West Lafayette, IN (US); Michael North, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 103 days.

(21) Appl. No.: 16/236,825

(22) Filed: Dec. 31, 2018

(65) Prior Publication Data

US 2019/0203080 A1 Jul. 4, 2019

Related U.S. Application Data

(60) Provisional application No. 62/612,472, filed on Dec. 31, 2017.

(51) Int. Cl.
*C09J 7/38* (2018.01)
*C09J 7/25* (2018.01)
*C08F 220/14* (2006.01)
*C09J 133/00* (2006.01)
*C09J 7/35* (2018.01)

(52) U.S. Cl.
CPC ............. *C09J 7/385* (2018.01); *C08F 220/14* (2013.01); *C09J 7/25* (2018.01); *C09J 7/35* (2018.01); *C09J 133/00* (2013.01); *C08F 2800/10* (2013.01); *C09J 2301/414* (2020.08); *C09J 2401/006* (2013.01); *C09J 2433/00* (2013.01)

(58) Field of Classification Search
CPC ........................................................ C09J 7/385
See application file for complete search history.

(56) References Cited

U.S. PATENT DOCUMENTS

| 2008/0171836 | A1* | 7/2008 | Lee ........................ C08G 71/04 525/418 |
| 2008/0286326 | A1* | 11/2008 | Benco ..................... A61L 31/10 424/423 |
| 2010/0267982 | A1* | 10/2010 | Kim ....................... C07C 275/26 560/27 |
| 2012/0308532 | A1* | 12/2012 | Hult ........................ A61L 27/26 424/93.7 |

(Continued)

FOREIGN PATENT DOCUMENTS

WO WO-2007127225 A2 * 11/2007 ............... C08K 5/19

OTHER PUBLICATIONS

Lee—bio-mimetic adhesive—Nature—2007 (Year: 2007).*

(Continued)

*Primary Examiner* — Callie E Shosho
*Assistant Examiner* — John Vincent Lawler
(74) *Attorney, Agent, or Firm* — Wolf, Greenfield & Sacks, P.C.

(57) ABSTRACT

Provided are adhesive compositions comprising copolymers having biomimetic cross-linkable monomers derived from mussel adhesive proteins. Also provided are methods of curing the adhesive compositions, methods of manufacturing the adhesive compositions, and devices comprising the adhesive compositions.

16 Claims, 2 Drawing Sheets

(56) References Cited

U.S. PATENT DOCUMENTS

2013/0163082 A1\* 6/2013 Tamada ............ G02F 1/133528
359/489.07
2017/0123106 A1\* 5/2017 Chien .................... G02B 1/043
2017/0266353 A1\* 9/2017 Murphy ................ A61L 31/088

OTHER PUBLICATIONS

Chung—cross-linkable DOPA terpolymer adhesives—Macromolecules—2012 (Year: 2012).\*
Leng—DOPA-inspired adhesive polymer—Langmuir—2013 (Year: 2013).\*
Meredith—Biomimetic adhesives—Adv.Funct.Mater.—2015 (Year: 2015).\*
Yang—crosslinking on adhesion of bio-inspired adhesive—Roy. Soc.Chem. Poly.Chem. 2015 (Year: 2015).\*

\* cited by examiner

ADHESIVES

RELATED APPLICATIONS

This application claims the benefit under 35 USC § 119(e) of U.S. Provisional Application No. 62/612,472, filed Dec. 31, 2017, the entire content of which is herein incorporated by reference.

FIELD OF INVENTION

This invention relates, in certain aspects, to adhesive compositions based on biomimetic copolymer systems (e.g., adhesive compositions emulating mussel adhesive proteins) which exhibit favorable strength, and to methods of manufacturing the same.

BACKGROUND

In the field of adhesive compositions, there has always been an interest to develop adhesives which exhibit high strength.

SUMMARY

The present disclosure solves this object with the subject matter disclosed herein. The advantages of the present disclosure will be further explained in detail in the section below and further advantages will become apparent to the skilled artisan upon consideration of the present disclosure.

The present inventors found that surprisingly strong adhesive compositions are obtained through unobvious selection of polymer monomers, and that adhesive strength of such compositions may be further enhanced by unobvious selection of additives and curing conditions.

Generally speaking, the present disclosure therefore relates to an adhesive composition comprising a copolymer, the copolymer consisting of a first co-monomer selected from one of dopamine methacrylamide, 3,4-dihydroxyphenylalanine and 3,4-dihydroxystyrene, and a second co-monomer that is an alkyl acrylate.

A further aspect of the present disclosure relates to a method of curing the adhesive composition, the method comprising the step of curing the adhesive at a curing temperature of between 75° C. and 85° C., optionally at a relative humidity of 85-95%.

A further aspect of the present disclosure relates to a method of manufacturing an adhesive composition, comprising the steps of copolymerizing a first co-monomer selected from one of dopamine methacrylamide, 3,4-dihydroxyphenylalanine and 3,4-dihydroxystyrene, and a second co-monomer that is an alkyl acrylate; combining the copolymer with about 0.01 to about 0.3 wt % $NH_4Cl$; and curing the adhesive at a curing temperature of between 75° C. and 85° C. under 85-95% relative humidity.

A further aspect of the disclosure provides a device comprising the adhesive composition of the present disclosure. For example, the device may comprise the adhesive composition on a triacetyl cellulose substrate.

Preferred embodiments of the compositions according to the present disclosure and other aspects of the present disclosure are described in the following description and the claims.

DETAILED DESCRIPTION

For a more complete understanding of the present disclosure, reference is now made to the following description of the illustrative embodiments thereof.

Figure 1:
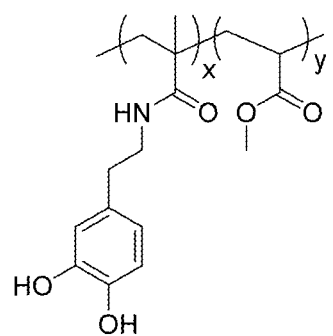
FIG. 1 shows the structure of a dopamine methacrylamide (DMA)/(MA)polymer for use in the adhesive composition of the present disclosure.

In a first embodiment, the present disclosure relates to an adhesive composition comprising a copolymer, the copolymer consisting of a first co-monomer selected from one of dopamine methacrylamide, 3,4-dihydroxyphenylalanine and 3,4-dihydroxystyrene, and a second co-monomer that is an alkyl acrylate. The first co-monomer selected from dopamine methacrylamide, 3,4-dihydroxyphenylalanine and 3,4-dihydroxy styrene, of which dopamine methacrylamide is preferred, is a biomimetic cross-linkable monomer derived from mussel adhesive proteins and mainly provides for the adhesion in the resulting compositions. The second co-monomer is an alkyl acrylate, of which methylacrylate (MA) is preferred. The structure of a polymer according to the composition of the present disclosure is shown in FIG. 1.

The alkyl moiety of the second co-monomer may be, for example and without limitation, $C_1$-$C_{15}$ straight, branched or cyclic alkyl groups and may be optionally further substituted.

In preferred embodiments, the first co-monomer is present in a proportion of about 10 mol % to about 50 mol %, preferably in a proportion of about 20 mol % to about 40 mol %, further preferably in a proportion of about 28 mol % to about 36 mol %, based on the total molar amounts of co-monomers present in the copolymer. The balance of the polymer consists of the second co-monomer.

In general, it is preferred that the number-average molecular weight ($M_n$) of the copolymer is at least 5000 g·mol$^{-1}$, further preferably between 5500 and 15000 g·mol$^{-1}$ from the viewpoint of favourable bulk adhesion.

While not being particularly limited, the polydispersity indices (PDIs) of the copolymer range between 1.3 to 2.0, preferably between 1.4 and 1.9.

The adhesive composition may comprise further conventional additives known in the art, such as e.g. emulsifiers, pigments, fillers, curing agents, thickeners, humectants, wetting agents, biocides, adhesion promoters, colorants, tackifying resins, UV stabilizers, waxes, antioxidants, and the like.

In particularly preferred embodiments, the adhesive composition further comprises $NH_4Cl$. More preferably still, the $NH_4Cl$ is present in an amount between about 0.01 to about 0.3 wt %.

The adhesive composition according to the present disclosure may be cured to enhance adhesive strength. Preferably, the adhesive is cured at a temperature of between 75° C. and 85° C.

In a second embodiment, the present disclosure relates to a method of manufacturing an adhesive composition, comprising the steps of: copolymerizing a first co-monomer selected from one of dopamine methacrylamide, 3,4-dihydroxyphenylalanine or 3,4-dihydroxystyrene, and a second co-monomer that is an alkyl acrylate; dissolving the copolymer; and dissolving $NH_4Cl$ in an amount between about 0.01 to about 0.3 wt %, and curing the adhesive at a curing temperature of between 75° C. and 85° C. under 85-95% relative humidity.

The copolymerization may be brought about according to methods known in the art.

While not being limited thereto, curing of the adhesive composition may be brought about after application on the adherend(s), for example by leaving the composition to stand in air at room temperature, or at an elevated temperature of between 30 and 80° C., for example.

Overall, it will be appreciated that the preferred features of the first and second embodiments specified above may be combined in any combination, except for combinations where at least some of the features are mutually exclusive.

Polymer characterization was carried out using $^1$H-MNR spectroscopy and gel permeation chromatography (GPC). The percentage of monomers in the backbone corresponded with the initial monomer feeds. Monomer ratios for the polymers were determined by integration of the aromatic region (δ 6.2-6.7 ppm) to give dopamine methacrylamide content and the backbone region (δ 0-2.4 ppm) for acrylic acid content. Molecular weight was determined by GPC using a Polymer Laboratories PR-GPC20 with the eluent tetrahydrofuran (THF).

Figure 2:
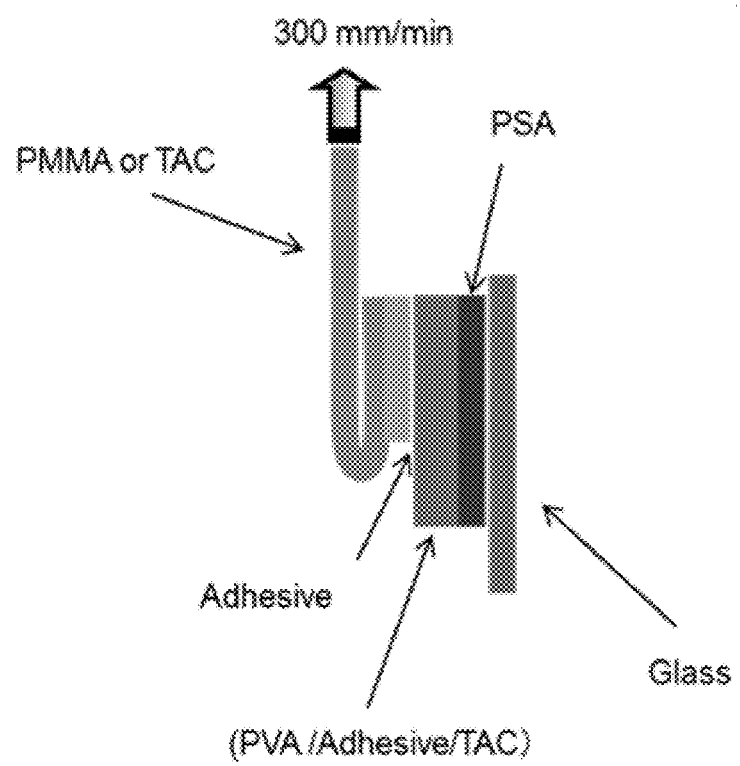
FIG. 2 depicts the peel test used to measure the strength of the adhesive compositions of the present disclosure.

FIG. 2 shows a peel test used to measure the strength of the adhesive compositions of the present disclosure. To a fixed glass substrate is adhered a polymer support that is adhered to the glass by a pressure sensitive adhesive (PSA). A polymer film (e.g. PMMA or triacetyl cellulose, TAC) is adhered by a polymer composition of the present disclosure. The film is then pulled in the plane of the film at a rate of 300 mm/min, and the force (N) required to peel the film from the adhesive was recorded.

As an alternative means for characterizing adhesive strength, lap shear measurements may be carried out in accordance with ASTM D1002.

EXAMPLES

Example 1

An adhesive copolymer was obtained via radical polymerization of dopamine methacrylamide and tert-butyl acrylate, followed by subsequent trifluoroacetic acid-mediated hydrolysis of the tert-butyl ester. Approximately 33 mol % dopamine methacrylamide monomer was targeted.

Synthesis of Poly {[dopamine methacrylamide]-co-[tert-butyl acrylate]}

Dopamine methacrylamide (3.0 g, 13.5 mmol), tert-butyl acrylate (4.0 mL, 27.3 mmol) and AIBN (31.6 mg, 0.192 mmol) were dissolved into dimethylformamide (24 mL) in a flame-dried Schlenk flask. After sparging with argon for 15 min at room temperature, the flask was placed into a 70° C. oil bath for 2 d. The reaction mixture became a viscous solution. The flask was removed from the oil bath and 1 mL of methanol was added to quench the reaction. To the cooled reaction was added dichloromethane (~10 mL) for dilution. The solution was then poured into excess ether (=200 mL) to precipitate a white polymer. The product was reprecipitated two additional times in dichloromethane/ether. Sonication along with minimal methanol was often necessary to solubilize the polymer. The product was dried in vacuo for two nights yielding 5.8 g (78%) of pure polymer.

Synthesis of Poly{[dopamine methacrylamide]-co-[acrylic acid]}

Poly {[dopamine methacrylamide]-co-[tert-butyl acrylate]} (2.2 g, 13.9 mmol) was dissolved into dichloromethane (≈30 mL) in a Schlenk flask. After sparging with argon for 15 min at room temperature, 10 mL trifluoroacetic acid was added dropwise and stirred at ambient under argon for 1 d. A solid mass of polymer precipitate resulted and was recovered by decanting off the solution. The product was dissolved in methanol and precipitated with ether. The product was reprecipitated two additional times in methanol/ether. The product was dried in vacuo for two nights yielding 1.6 g (96%) of pure polymer.

A Varian Inova-300 MHz spectrometer was used to record $^1$H-NMR spectra. Monomer ratios were determined by integration of the aromatic region (δ 6.2-6.7 ppm) to give dopamine methacrylamide content and the backbone region (δ 0-2.4 ppm) for acrylic acid content. Molecular weights were found by gel permeation chromatography (GPC) using a Polymer Laboratories PL-GPC20 with eluent tetrahydrofuran (THF). The monomer tert-butyl acrylate was purchased from Sigma Aldrich and purified using an alumina column. Trifluoroacetic acid was also purchased from Sigma Aldrich and was stored under argon while not in use. All other chemicals used were purchased from Sigma Aldrich and used as received. Synthesis of the dopamine methacrylamide monomer followed a published procedure and was characterized by $^1$H-NMR spectroscopy. All polymers were prepared by free radical polymerization under an inert argon atmosphere using typical Schlenk techniques. The radical initiator, azobisisobutyronitrile (AIBN), was recrystallized from methanol and dried in vacuo prior to use. Dimethylformamide (DMF) solvent was degassed with bubbling argon for at least 15 min prior to starting a reaction.

In general, polymer characterization was carried out using NMR spectroscopy and gel permeation chromatography (GPC). The percentage of monomers in the backbone corresponded with the initial monomer feeds. The dopamine methacrylate content ranged from 28 to 37 mol %. The number-average molecular weights (Mn) ranged from 6,000 g·mol$^{-1}$ to 14,000 g·mol$^{-1}$ with polydispersity indices (PDIs) of 1.4 to 1.9.

Example 2

Synthesis of Poly {[dopamine methacrylamide]-co-[methyl acrylate]}

Dopamine methacrylamide (3.0 g, 13.5 mmol), methyl acrylate (2.6 mL, 29.0 mmol) and AIBN (31.6 mg, 0.192 mmol) were dissolved into dimethylformamide (24 mL) in a flame-dried Schlenk flask. After sparging with argon for 15 min at room temperature, the flask was placed into a 70° C. oil bath for 2 d. The reaction mixture became a viscous solution.

The flask was removed from the oil bath and 1 mL of methanol was added to quench the reaction. To the cooled reaction was added dichloromethane (~10 mL) for dilution. The solution was then poured into a 1% aqueous HCl solution (<<100 mL) to precipitate a white polymer. The product was reprecipitated three additional times in dichloromethane/ether. Sonication along with minimal methanol was often necessary to solubilize the polymer. The product was dried in vacuo for two nights yielding 4.5 g (58%) of pure polymer.

Example 3

The polymer of Example 2 was dissolved in MeOH and 0.01 wt % NH$_4$Cl was added. The adhesive was applied to a triacetyl cellulose substrate and cured at 80° C. and 90% relative humidity. The strength as measured by the peel test according to FIG. 2 was 2.43 N.

Example 4

The polymer of Example 2 was dissolved in MeOH and 0.05 wt % $NH_4Cl$ was added. The adhesive was applied to a triacetyl cellulose substrate and cured at 80° C. and 90% relative humidity. The strength as measured by the peel test according to FIG. 2 was 1.14 N.

Example 5

The polymer of Example 2 was dissolved in MeOH and 0.1 wt % $NH_4Cl$ was added. The adhesive was applied to a triacetyl cellulose substrate and cured at 80° C. and 90% relative humidity. The strength as measured by the peel test according to FIG. 2 was 6.08 N.

Examples 3-5 show that the strength of the adhesive is surprisingly enhanced at 0.1 wt %, while increasing the amount of $NH_4Cl$ from 0.01 to 0.05 wt % decreased strength.

Comparative Example 6

Prepared according to Example 5 except that 0.1 wt % $NH_3$ was substituted for $NH_4Cl$. The strength as measured by the peel test according to FIG. 2 was 0.59 N.

Comparative Example 7

Prepared according to Example 5 except that 0.1 wt % BHT was substituted for $NH_4Cl$. The strength as measured by the peel test according to FIG. 2 was 0.29 N.

Comparative Examples 6 and 7 show that enhancement of the strength of the adhesive composition of the present disclosure is achieved using $NH_4Cl$ but not BHT or $NH_3$.

Comparative Example 8

Prepared according to Example 5 except that the polymer was terpolymer of 10% DMA/50% MMA/PEG40. The strength as measured by the peel test according to FIG. 2 was 0.25 N. MMA is methyl methacrylate.

Comparative Example 9

Prepared according to Example 5 except that the polymer was terpolymer of 16% DMA/36% MMA/PEG40. The strength as measured by the peel test according to FIG. 2 was 0.25 N.

Comparative Examples 8 and 9 show that addition of PEG to the polymer markedly decreases adhesive strength.

As has been shown above, adhesive polymers having enhanced strength have been thus identified.

Once given the above disclosure, many other features, modifications, and improvements will become apparent to the skilled artisan.

The invention claimed is:

1. An adhesive composition comprising a copolymer and $NH_4Cl$, the copolymer consisting of a first co-monomer of dopamine methacrylamide 3,4-dihydroxyphenylalanine, or 3,4-dihydroxystyrene, and a second co-monomer that is an alkyl acrylate.

2. The adhesive composition of claim 1, wherein the first co-monomer is present in a proportion of about 10 mol % to about 50 mol % of the copolymer.

3. The adhesive composition of claim 1, wherein the first co-monomer is present in a proportion of about 20 mol % to about 40 mol % of the copolymer.

4. The adhesive composition of claim 1, wherein the first co-monomer is present in a proportion of about 28 mol % to about 36 mol % of the copolymer.

5. The adhesive composition according to claim 1, wherein the first co-monomer is dopamine methacrylamide.

6. The adhesive composition according to claim 1, wherein the second co-monomer is methyl acrylate.

7. The adhesive composition of claim 1, wherein $NH_4Cl$ is present in an amount of about 0.01 to about 0.3 wt %.

8. A method for curing the adhesive composition of claim 1, the method comprising the step of curing the adhesive composition at a curing temperature of 75° C. to 85° C.

9. The method of claim 8 in which the curing step is carried out under 85-95% relative humidity.

10. A device comprising the adhesive composition of claim 1 adhered to a triacetyl cellulose substrate.

11. A method of manufacturing an adhesive composition, the method comprising the steps of:
copolymerizing a first co-monomer of dopamine methacrylamide, 3,4-dihydroxyphenylalanine or 3,4-dihydroxystyrene, and a second co-monomer that is an alkyl acrylate;
combining the copolymer with $NH_4Cl$ that is present in an amount of about 0.01 to about 0.3 wt %; and
curing at a temperature of 75° C. to 85° C. under 85-95% relative humidity.

12. An adhesive composition comprising a copolymer, the copolymer consisting of a first co-monomer that is dopamine methacrylamide, and a second co-monomer that is an alkyl acrylate, wherein the first co-monomer is present in a proportion of about 20 mol % to about 40 mol % of the copolymer.

13. The adhesive composition of claim 12, wherein the first co-monomer is present in a proportion of about 28 mol % to about 36 mol % of the copolymer.

14. The adhesive composition according to claim 12, wherein the second co-monomer is methyl acrylate.

15. The adhesive composition according to claim 12, wherein the composition further comprises $NH_4Cl$.

16. The adhesive composition of claim 15, wherein $NH_4Cl$ is present in an amount of about 0.01 to about 0.3 wt %.

* * * * *